United States Patent
Mejia

[15] 3,665,150
[45] May 23, 1972

[54] ELECTRICAL WELDING MACHINE HAVING AMPERAGE CONTROL TRANSFORMER

[72] Inventor: Salvador Mejia, Mexico D. F., Mexico

[73] Assignee: Industrias Sigma, S.A. de C.V., Colonia Industrial Vallejo, Mexico, D.F., Mexico

[22] Filed: Sept. 18, 1970

[21] Appl. No.: 73,275

[30] Foreign Application Priority Data

Nov. 21, 1969 Mexico.................................115,484

[52] U.S. Cl........................219/131 WR, 219/135, 336/170, 336/173, 336/215
[51] Int. Cl......................................B23k 9/10, H01f 40/08
[58] Field of Search...............219/131 R, 131 WR, 132, 135; 336/170, 173, 215

[56] References Cited

UNITED STATES PATENTS

| | | | |
|---|---|---|---|
| 3,059,170 | 10/1962 | Jetter................................ | 219/131 X |
| 2,644,109 | 6/1953 | Mulder.............................. | 219/131 X |
| 3,493,718 | 2/1970 | Kestner et al...................... | 219/131 R |

Primary Examiner—R. F. Staubly
Attorney—Thomas M. Marshall

[57] ABSTRACT

An arc welding unit operable on single or multiple phase alternating current and including for each phase a basic control device including a three-legged magnetic core. A primary leg includes a portion of the secondary, or output, winding, the remainder of which is wound on a secondary leg of the core. Flux through the secondary leg is controlled by regulating the duty cycle of the saturation current through a control winding on the third leg of the core, and flux-induced emf in the secondary winding due to current flow through the control winding is essentially eliminated because the secondary is formed on both the primary and secondary legs.

4 Claims, 12 Drawing Figures

Patented May 23, 1972

INVENTOR
SALVATOR MEJIA

BY

*Thomas M. Marshall*
ATTORNEY

INVENTOR
SALVATOR MEJIA

INVENTOR
SALVATOR MEJIA

INVENTOR
SALVATOR MEJIA

INVENTOR
SALVATOR MEJIA

Patented May 23, 1972

INVENTOR
SALVATOR MEJIA

BY

*Thomas M Marshall*
ATTORNEY

INVENTOR
SALVATOR MEJIA

ATTORNEY

ELECTRICAL WELDING MACHINE HAVING AMPERAGE CONTROL TRANSFORMER

BACKGROUND OF THE INVENTION

The present invention relates to an improved system for controlling welding current in electric welding machines.

There are currently many welding machines with different types of welding current control. One such known system for controlling the welding amperage is mechanical and may implement a moving coil, moving core or moving reactor. In those machines, however, all parts subject to movement may undergo excessive wear, causing misadjustments, vibrations and clogging of the machine due to dust and foreign atmospheric agents. Moreover, they tend to have a high cost.

Another type of system is the electromagnetic type, which operates by changing the magnetic coupling between the primary and the secondary windings of a transformer by means of taps, either on the primary side or on the secondary side, or through manual plugs, switches or selectors. This type of control is the simplest among the electromagnetic type but suffers the following shortcomings: a reduced number of limited welding amperages, possible different open-circuit voltages on each tap, faulty contacts in the plugs due to wear and clogging due to dust or atmospheric agents.

A different version of the electromagnetic control uses a saturable reactor in series with the secondary of the main transformer, and control of the welding current is obtained by modifying the saturation of the reactor. Disadvantages of this type of control include excessive weight of the machine attributable to large saturable reactors, and the high cost of auxiliary windings used in the saturable reactor. On the other hand, it has the advantage of not having moving parts which can be subjected to wear.

It is consequently among the objects of the present invention to avoid the deficiencies of the prior art devices and to provide a welding machine which requires no moving parts, is lightweight, simple and economically constructed and is capable of obtaining an infinite range of amperages selectable by remote control adjustment of, for example, a potentiometer of reduced dimensions.

SUMMARY OF THE INVENTION

In brief, the foregoing objects are attained by an electric welding machine incorporating a current control device having primary means for establishing flux in a magnetic circuit, means in magnetic circuit with the flux to provide an output current, and controllable means magnetically coupled to the primary means for altering the flux in the magnetic circuit and thereby controlling the output current. In a preferred embodiment, the control device includes a ferromagnetic core having three legs, the third of which is saturable according to the current in a control winding on that leg. The other legs are wound with the primary and secondary windings, the latter being wound partially on each of the primary and secondary legs to counter any emf induced by current variations in the control winding.

The foregoing control device may be considered a basic unit, or module, which represents a single phase, alternating current, welding machine. However, single phase machines of greater capacity can be obtained by connecting in parallel two or more basic control units, and rectifier circuits at the output can be used to convert the output to direct current. Basic modules can be connected to have their primary magnetic circuits in various multiphase arrangements and both primary and secondary circuits can be connected, for example, in polyphase delta or star for obtaining welding machines with increased capacity and fed with three-phase current.

BRIEF DESCRIPTION OF THE DRAWINGS

For a better understanding of the invention, together with the objects and advantages thereof, reference may be made to the following detailed description, and to the drawings in which.

DESCRIPTION OF THE PREFERRED EMBODIMENTS OF THE INVENTION

Figure 1:
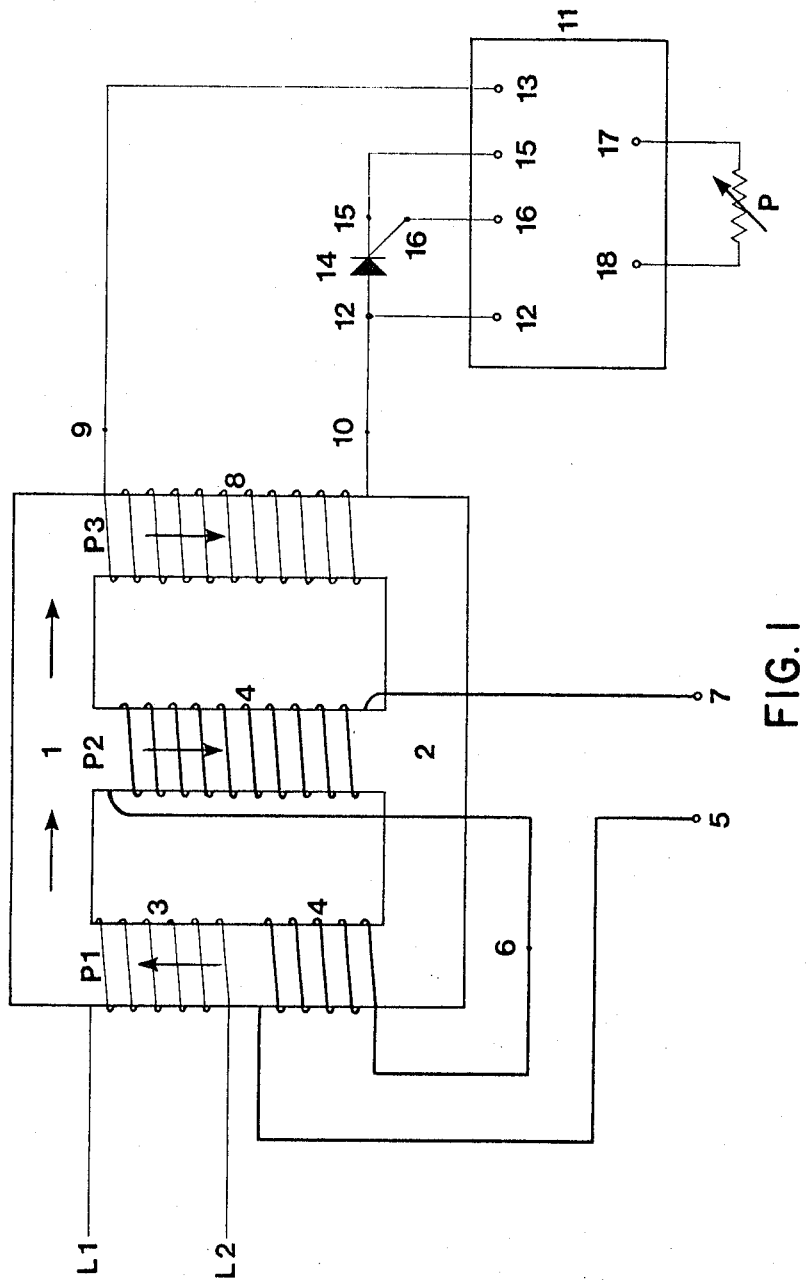
FIG. 1 is a diagram of the basic module of a control device according to the present invention.

The principle of operation of the invention is best described by reference to the basic element, or module, of the invention as shown in FIG. 1. The control module includes a magnetic nucleus, or core, having three legs P1, P2 and P3, respectively, closed through upper and lower shoulders 1 and 2 which connect the legs. A primary winding 3 is wound on the leg P1 which, in turn, is connected to be fed from input lines L1 and L2. On the same leg P1 is wound part of the secondary winding 4 which, together with the primary winding 3 and core, forms a transformer. Terminals 5 and 6 correspond to the portion of the secondary winding wound on the common leg P1 with the primary winding 3.

The other part of the secondary winding 4 is wound on the leg P2 and is connected in series with the first part on the leg P1. Its terminals are numbered 6 and 7, respectively, so that the series output of the secondary winding 4 appears across the secondary terminals 5 and 7.

In accordance with the invention, an auxiliary, or control, winding 8 is wound on the third leg P3 of the core, having its terminals 9, 10 connected to an electrical control circuit 11 via circuit terminals 12 and 13, respectively, as can be seen in FIG. 1. This electronic circuit 11 comprises a controllable electronic switch, such as a thyristor, and its associated control circuitry. Upon conduction of the thyristor by activation of the gate electrode coupled to the terminal 16, current is permitted to flow in the current loop that includes the control winding 8 and the path between the cathode 15 and the anode 12.

Control by the electronic circuit 11 of the current circulating through the control winding 8 is obtained by adjustment of the potentiometer, or variable resistance, P that is interconnected with the electronic circuit 11 through the terminals 17 and 18. As will appear shortly, the circuit 11 adjusts the duty cycle of current through the control winding.

The operation of the basic module of FIG. 1 is as follows. Whenever there is magnetic flux originated by the primary winding 3, connected to a power source through L1 and L2, the flux flows in a primary magnetic circuit including the legs P1 and P2 and the shoulders 1, 2. Another magnetic loop exists between the legs P1 and P3 and the shoulders 1 and 2. As a result of flux generated by current through the primary winding, an electromotive force is induced in the secondary winding 4 and appears between the terminals 5 and 7, the value of this emf being proportional to the number of relative turns of the transformer windings and to the amount of flux circulating through legs P1 and P2, respectively. A small amount of flux circulates in the magnetic circuit of P1 and P3 and induces an electromotive force between the terminals 9 and 10 of the control winding 8.

Under load, the normal tendency of the flux emanating from the primary winding 3 is to by-pass the secondary leg P2 and circulate through the leg P3 containing the auxiliary winding 8. When the load is applied to the secondary winding 4, between terminals 5 and 7, there is an opposition to the flow of the flux through the intermediate leg P2 and the flux therefore tends to travel to the auxiliary leg P3, increasing the electromotive force induced between the terminals 9 and 10 of the control winding. Consequently, the invention takes advantage of this natural tendency to control the welding current, providing a simple system that is both economic and of great versatility for using the auxiliary winding 8 as a gate. The current which will pass through the secondary winding 4 will be directly related to the current which passes through the auxiliary winding 8.

The foregoing is achieved through operation of the thyristor 14, which regulates the current that flows through the control winding. This current is effective to autosaturate the leg P3 in greater or lesser degree, depending on the period and duration of conduction of the thyristor 14. The degree of saturation of the leg P3 determines the emf induced and, therefore, indirectly regulates the amount of flux through the intermediate leg P2 when the secondary winding 4 is under load.

To obtain a given current in the secondary of the transformer, the potentiometer P of the electronic circuit 11 need only be adjusted to allow a greater or lesser conduction through the device 14. As noted, the conduction through the winding 8 establishes the degree of autosaturation of the leg P3 and thereby the degree to which flux is forced to flow through the leg P2, proportionately. Since the thyristor 14 conducts unidirectionally, in accordance with its conduction duty cycle, there is a half wave component of the magnetic flux through each of the legs P1 and P2. Since, however, the secondary is wound partly on legs P1 and P2, the induced emf at the output of the secondary winding, owing to the half wave current drawn from the primary and shared by legs P1 and P2, is practically nullified by properly selecting the direction of winding, the relative turns and the cross-sectional areas of the core legs.

Figure 2:
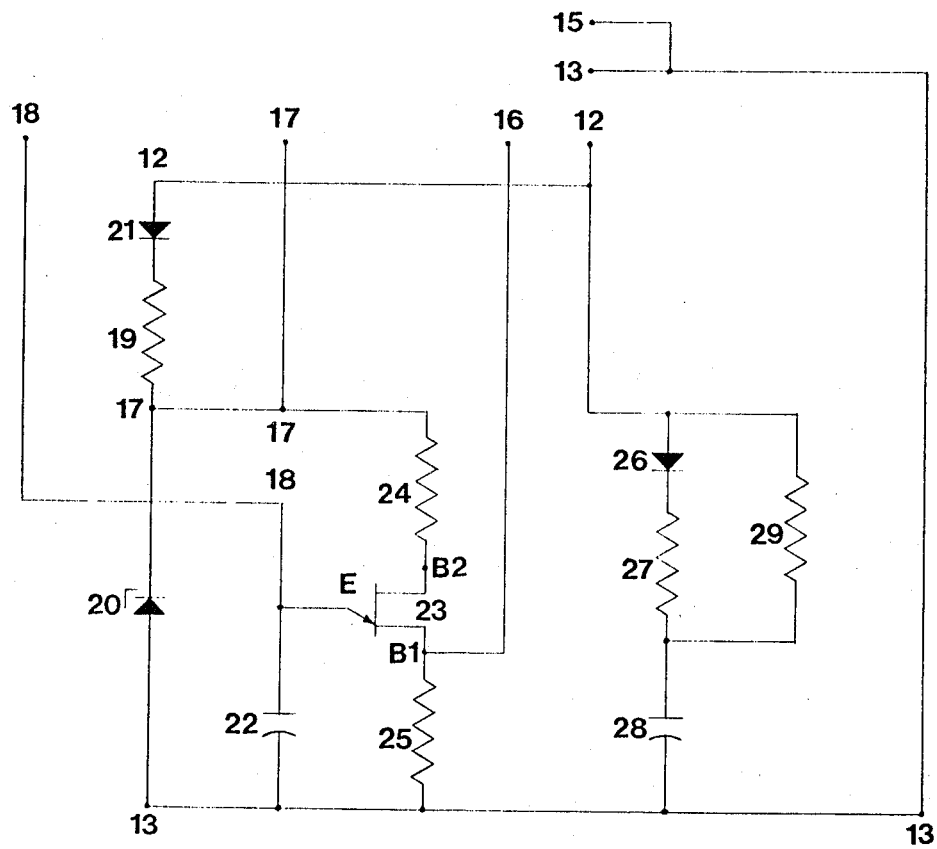
FIG. 2 is an electrical schematic diagram of an electronic control circuit suitable for use with the invention.

The description and operation of the electronic device which regulates the timing and duty cycle of conduction of the thyristor 14 in FIG. 1 is illustrated in schematic detail in FIG. 2. Once the desired amperage has been preselected through setting of the potentiometer P (FIG. 1), the primary winding being connected to L1 and L2 and the welding current load being present on the secondary between terminals 5 and 7, an electromotive force set up by the open circuit (no load) magnetization flux through P3 is induced between the terminals 9 and 10. Since this latter is interconnected between the terminals 12 and 13 and through the resistance 19, which produces a drop in voltage between the points 12 and 17, a voltage regulated by the zener diode 20 is established between the points 17 and 13. This direct current voltage (half wave rectified by the diode 21) feeds the potentiometer P (connected between the points 17 and 18), and by its adjustment, a variation in the current circulating between the points 17 and 13 is obtained, charging with more or less speed the capacitor 22 in FIG. 2.

The regulated voltage between the points 17 and 13 also biases the bases B2 and B1 of the unijunction transistor 23 in series with external resistances 24 and 25. With the capacitor 22, the transistor 23 forms a relaxation oscillator, the capacitor 22 periodically discharging through the emitter E of the transistor 23, the base B1 and the resistance 25. As a result, a series of synchronized pulses appears between the points 16 and 13, which in turn is impressed between the gate and cathode of the thyristor 14. The timing and period of conduction of the thyristor 14 is thus a function of the voltage pulses developed across the resistance 25, and these pulses are thus effective to regulate the average autosaturation current of the leg P3 and, consequently, the current through the secondary winding 4 (FIG. 1).

In FIG. 2, the diode 26, the resistance 27, the capacitor 28 and the resistance 29 comprise a stabilization circuit to eliminate parasite conduction of the thyristor.

DESCRIPTION AND OPERATION OF A SINGLE PHASE, ALTERNATING CURRENT WELDING MACHINE WITH A SINGLE MODULE

Figure 3:
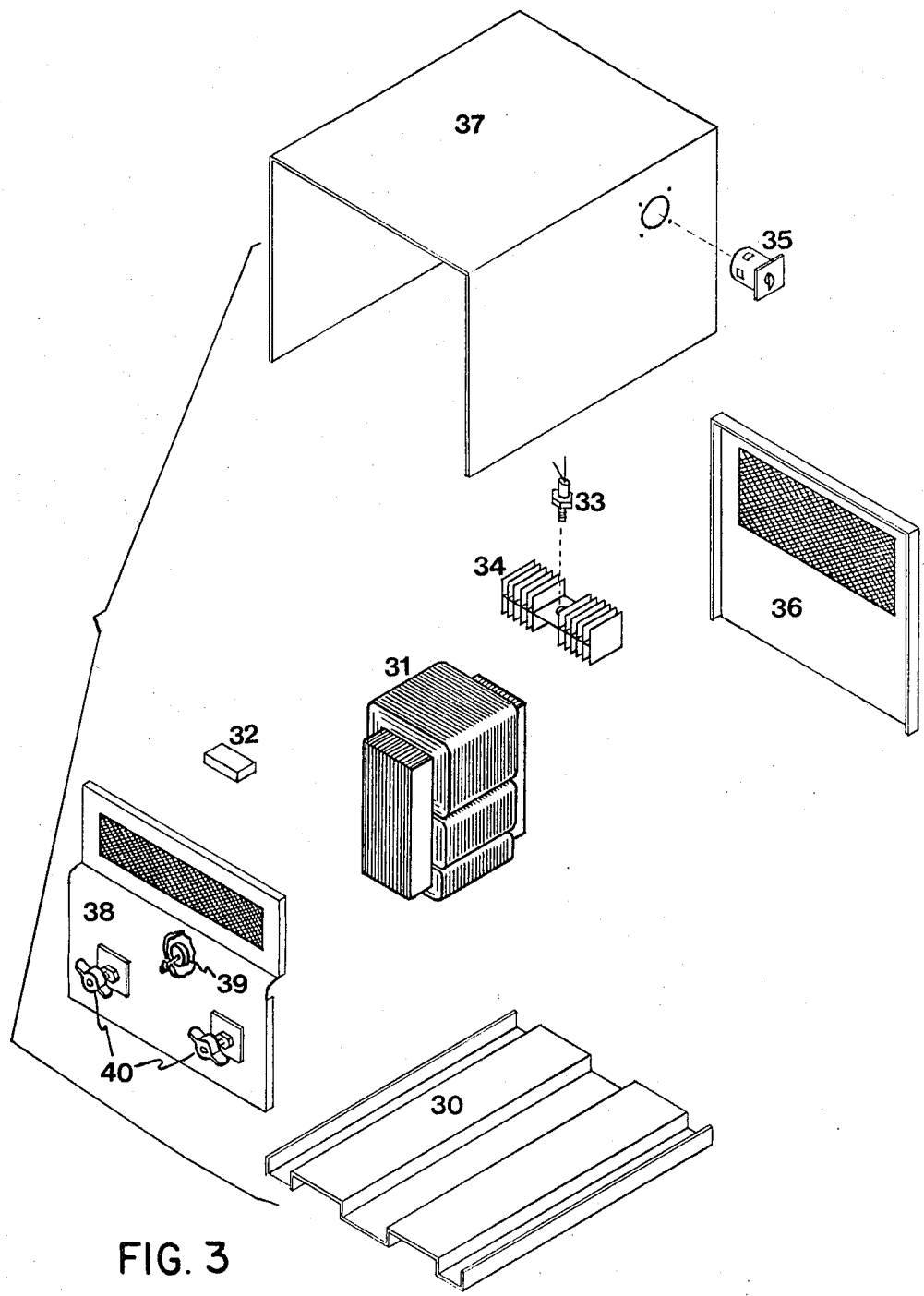
FIG. 3 is an exploded perspective view of the main components of a single phase, alternating current device according to the invention and having one module of the type represented in FIG. 1.

As observed from the illustration of FIG. 3, the complete welding machine according to the invention is formed of the following physical parts (assigned different identifying numerals than the corresponding electrical components): a main base 30, a welding transformer or module 31, (as described in FIG. 1), an electronic device 32 (as represented by the typical circuit of FIG. 2) for the thyristor, a controlled silicon rectifier or other thyristor 33, a heat sink 34 for the thyristor, a main switch 35, a back cover 36, a cover 37, a front cover 28, an adjusting potentiometer or welding amperage selector 39 and the output terminals 40.

Figure 4:
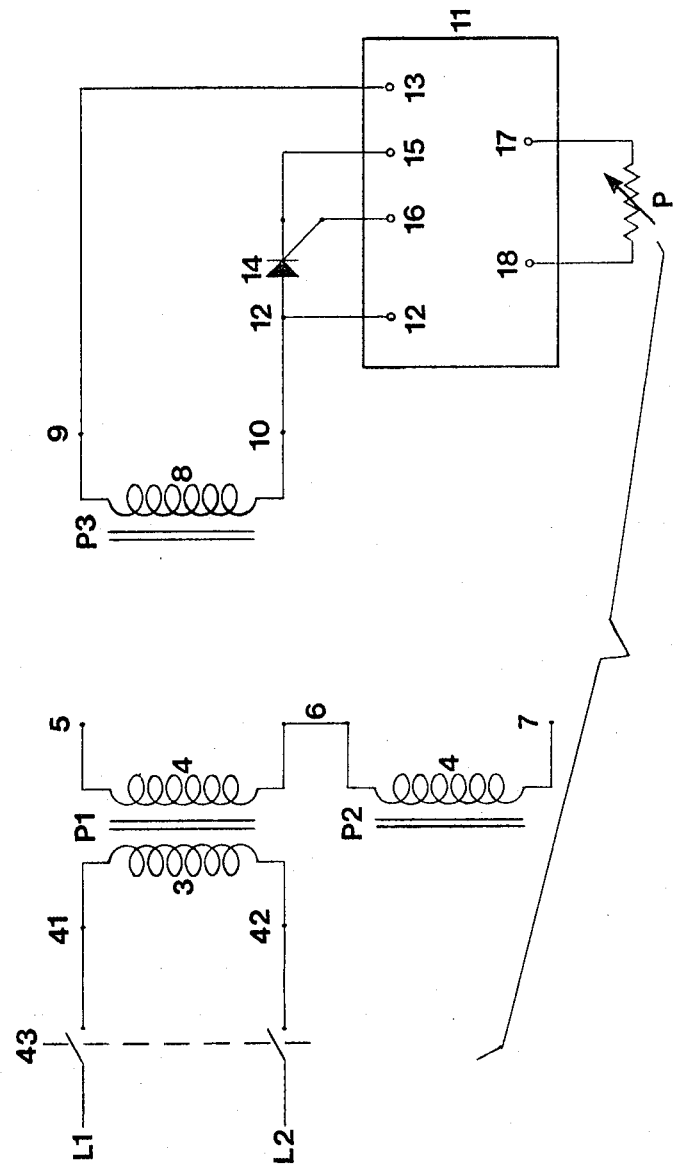
FIG. 4 is an electrical diagram of a single phase, alternating current device according to the invention.

Referring to the diagram of FIG. 4, the operation of the machine is as follows: When the primary of the transformer module, whose terminals are 41 and 42 in FIG. 4, is connected to the lines L1 and L2 through the switch 43, an electromotive force is induced between the terminals 5 and 7 of the secondary winding 4 and also at the ends 9 and 10 of the control winding 8.

As the load appears on the secondary due, for example, to a welding arc, the magnitude of current flowing through the secondary 4 depends on the degree of autosaturation of the leg P3 of the transformer 31. This condition is obtained by the adjustment of the potentiometer P connected to the electronic circuit 11, which sends signals representative of the selected condition to the gate 16 of the thyristor 14. Thus, the operation of the welding machine corresponds to that described hereinabove in regard to the main transformer, as well as to that explained in connection with the electronic control circuit 11 of FIG. 2.

DESCRIPTION AND OPERATION OF A SINGLE PHASE, ALTERNATING CURRENT WELDING MACHINE WITH TWO MODULES CONNECTED IN PARALLEL

As previously pointed out, one of the main advantages of the present invention is that it allows the standardization of the main components in welding machines of different capacities and types of connection, both single phase and polyphase. This allows the use of the same basic unit, or welding transformer, to manufacture a great variety of welding machines. The following description corresponds to a single-phase, alternating current welding machine constructed with two such transformers connected in parallel for obtaining double current capacity with a single regulating control system.

Figure 5:
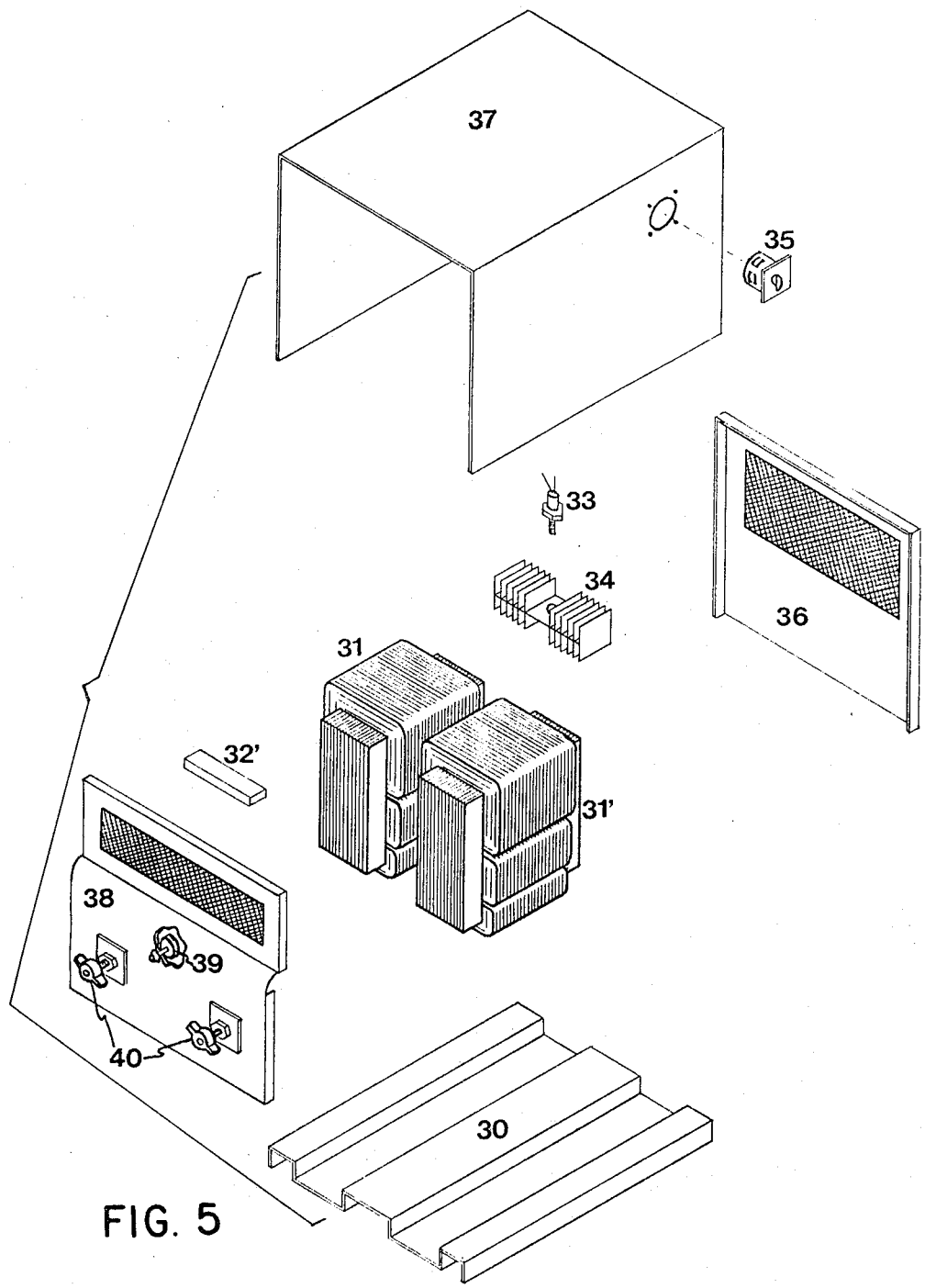
FIG. 5 is an exploded perspective view of the main components of a single-phase, alternating current device implementing two modules of the type depicted in FIG. 1.
Figure 6:
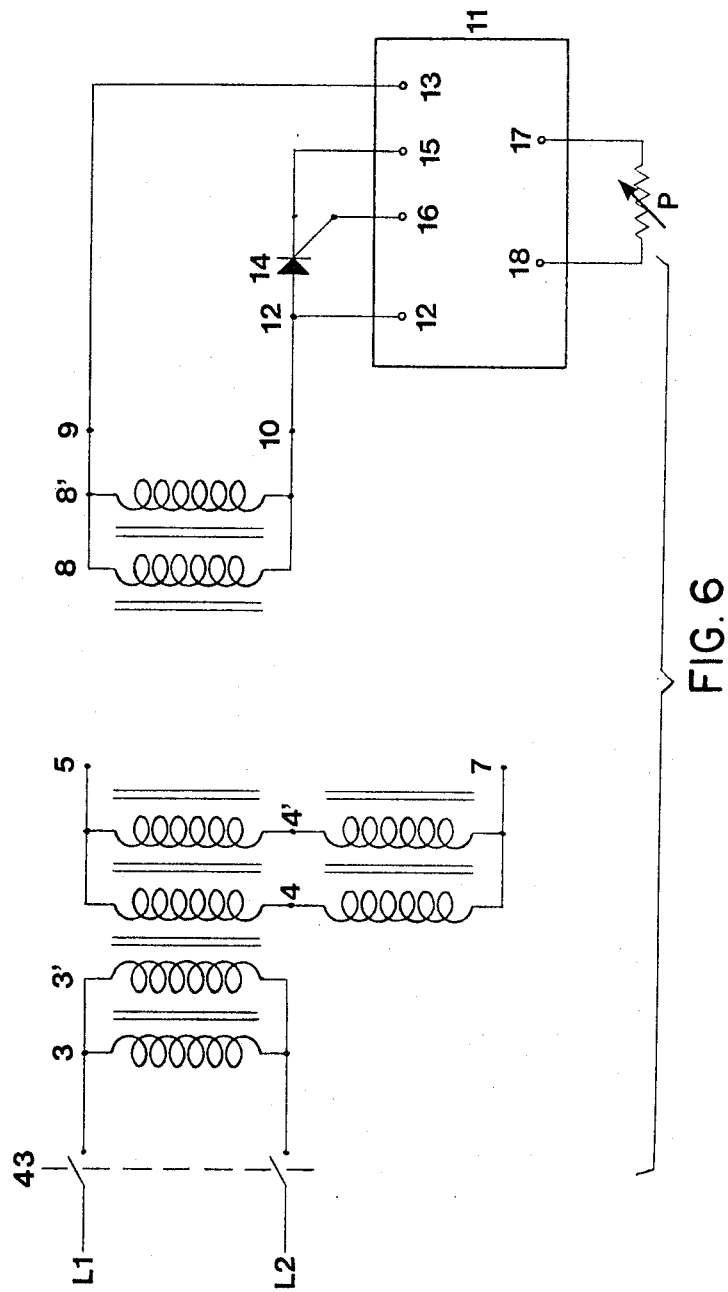
FIG. 6 is an electrical system diagram of the welding machine illustrated in FIG. 5.

Referring to FIG. 5, the main components are seen to be: the main base 30, two transformers or modules 31 and 31', a single electronic circuit 32', a thyristor 33, a heat exchanger 34 for the thyristor, a main switch 35, a back cover 36, a cover 37, a front cover 38, a potentiometer 39 and the terminals 40. The operation of the machine is substantially identical to that described in regard to a machine with one module. The connections are shown in FIG. 6.

The feed lines L1 and L2 energize both primaries 3 and 3' of the modules, which are connected in parallel through the switch 43. Likewise, the secondaries 4 and 4' are connected in parallel, and their terminals 5 and 7 are the welding (output) terminals. The control windings 8 and 8' are also connected in parallel and their terminals 9 and 10 are coupled to the single electronic control circuit 11 (32'), at points 13, 12, the latter corresponding to the anode 12 of the thyristor 14.

The potentiometer P is connected to the electronic device 11 through the terminals 18 and 17, and the gate of thyristor 14 is joined to the circuit through the terminal 16. In this manner, by adjusting the potentiometer P, the welding current can be regulated, autosaturating in greater or lesser degree the control winding of each module. Since they are connected in parallel, the total current available is regulated.

Figure 7:
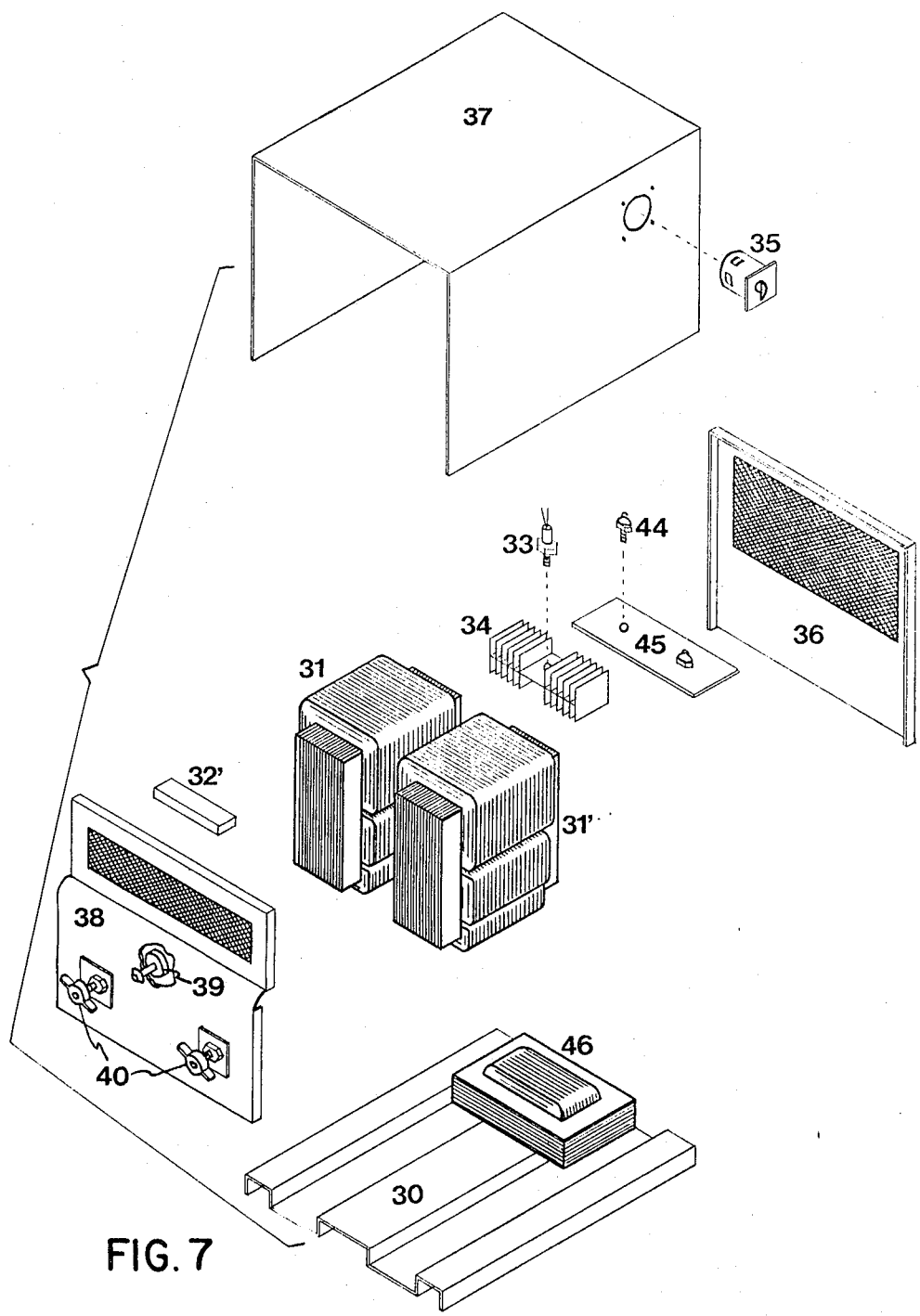
FIG. 7 is an exploded perspective view of the components of a single-phase, direct current-alternating current welding machine, using two modules of the type depicted in FIG. 1.

FIG. 7 illustrates the main components of an improved machine similar to that described in connection with FIGS. 5 and 6. Thus, the main components are identical in all respects, except for the addition of the main diodes 44, associated heat exchanger 45, and a reactor 46.

The operation of the machine is similar to that described above for the parallel connection, and differs only in the connections of the complementary parts.

Figure 8:
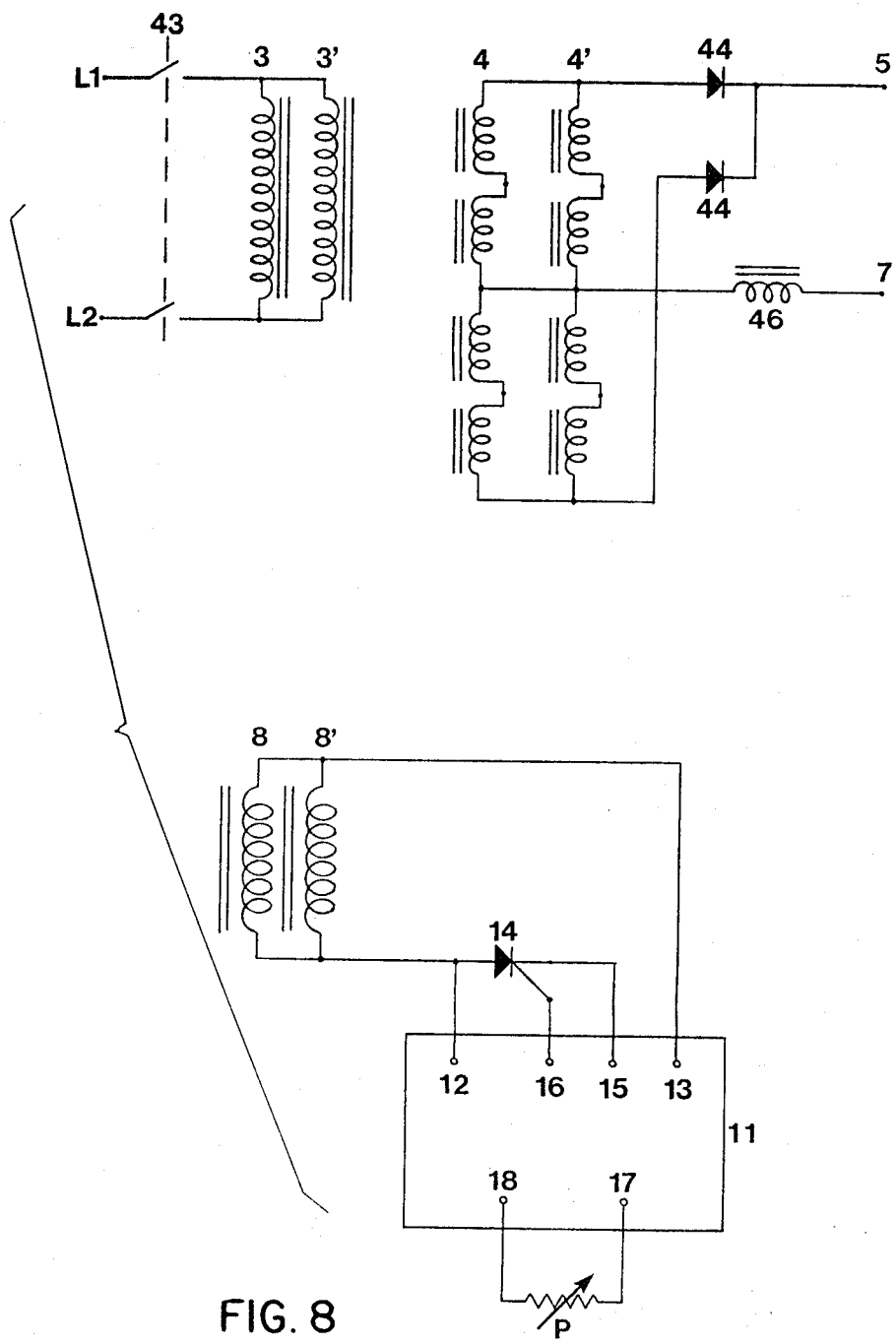
FIG. 8 is an electric system diagram corresponding to the welding machine shown in FIG. 7.

Turning to FIG. 8, the primaries 3, 3' of both modules are connected to the lines L1 and L2 through the bi-polar switch 43 and each of the secondary windings 4 and 4' has a center tap connected to the output terminal 7 through the filtering reactor 46. The ends of the windings 4 and 4', joined in parallel, are connected to the output terminal 5 through the main output diodes 44. The control windings 8, 8' of both modules are regulated through the single thyristor 14.

WELDING MACHINE HAVING THREE PHASE SUPPLY AND DIRECT CURRENT OUTPUT, "T" OR SCOTT PRIMARY AND BIPHASE STAR SECONDARY

The versatility of the single electronic control and universal module connected in different forms, as has been previously mentioned, allows the economic construction of single-phase and polyphase machines with different capacities, depending on the number of modules that they contain. The main components of a three-phase machine constructed with two modules connected in Scott and with a direct current output are pictorially illustrated in FIG. 9. In addition to the components described in connection with FIGS. 7 and 8, this machine uses a dual circuit control device 32' and an additional thyristor 33', and heat exchanger 34', together with added main diodes 44' and the heat exchanger 45'. All other elements are essentially the same.

Operation of the three-phase machine is basically the same as for a single-phase, single-module machine, except that the control windings of each module operate at 90° (electrical) phase difference and are regulated through two separate thyristors and two electronic circuits of the device 32'. Preferably, the adjustable potentiometer P includes separate but mechanically ganged resistances, one for each circuit.

Figure 9:
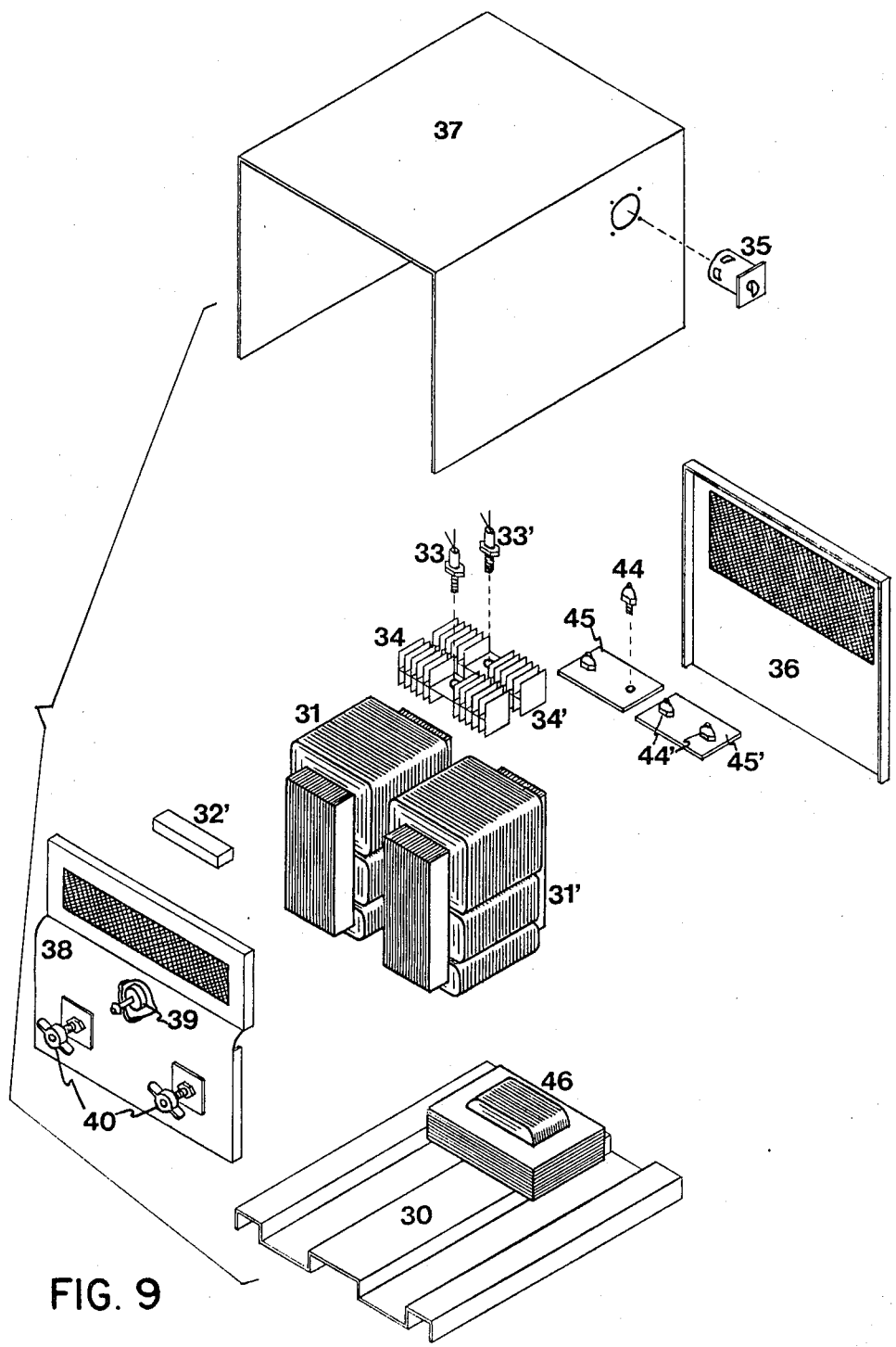
FIG. 9 is an exploded perspective view of the main components of a three phase, direct current, welding machine with two modules.
Figure 10:
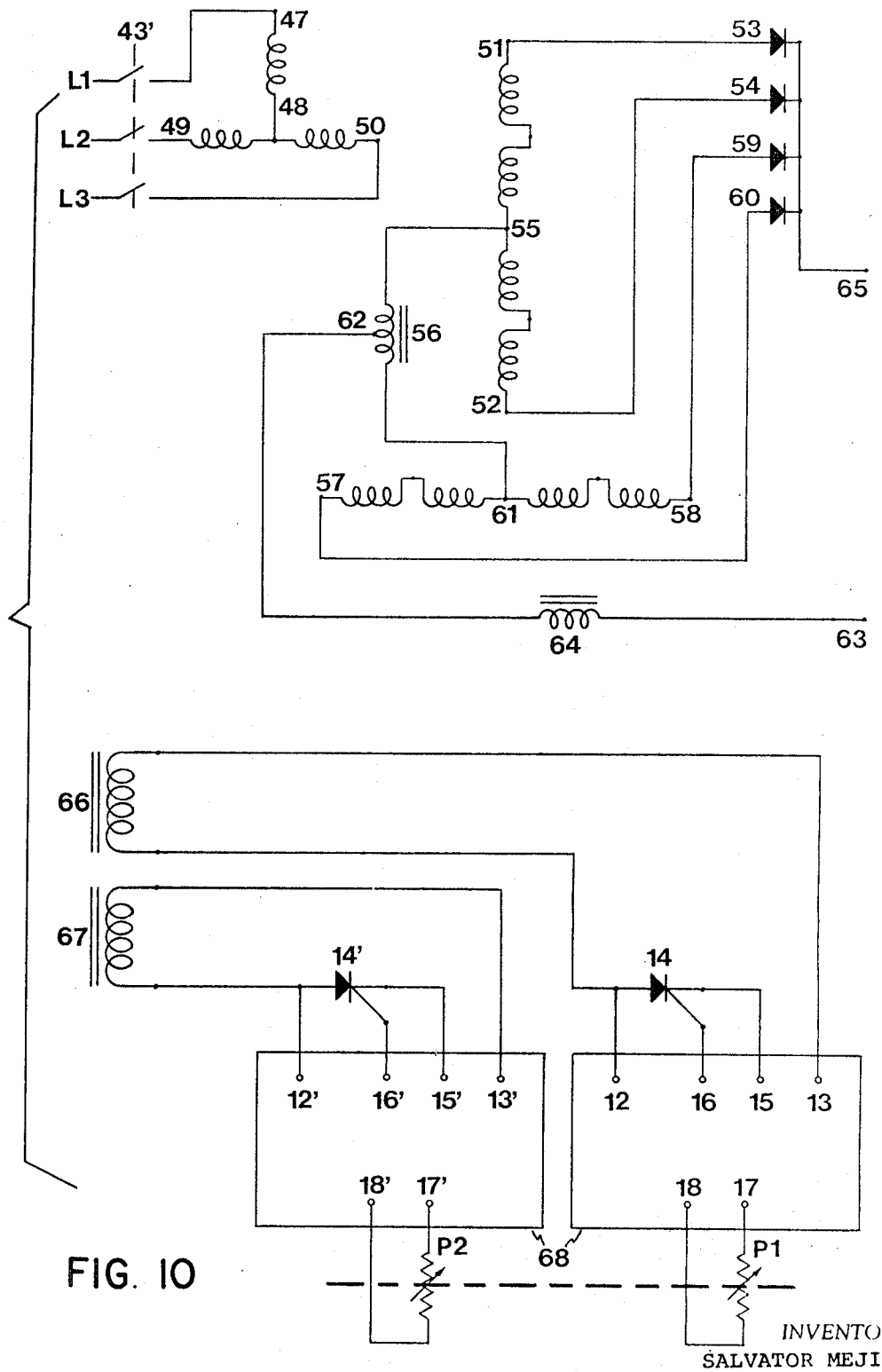
FIG. 10 is an electrical system diagram of the welding machine shown in FIG. 9 connected on "T" or Scott in the primary and in two-phase star at the secondary.

The multiphase connections for the FIG. 9 machine are best appreciated from FIG. 10. A primary winding of the first transformer or module, having terminals 47 and 48, is connected in "T" or Scott with the primary of the second module. The second primary's terminals are 49 and 50, center-tapped at 48. The terminals 47, 49, and 50 are connected to L1, L2 and L through a three-phase switch 43'.

The secondary winding of the first module, whose ends are 51 and 52, is coupled through two diodes 53 and 54 to a common output terminal 65. Its center tap 55 is connected to one end of an inter-phase transformer 56. The secondary winding of the second module, having terminal ends 57 and 58, is similarly coupled through diodes 59 and 60 to the output terminal 65, its center tap 61 likewise being connected to the other end of the inter-phase transformer 56. The center tap 62 of the inter-phase transformer is connected to the second output terminal 63 through the filtering reactor 64, corresponding to the inductance of the reactor 46.

The control windings 66 and 67 of both modules are connected to a dual electronic control device 68, each part of which is connected in a manner already explained with respect to the single-phase machines. Of course, each circuit is regulated by adjustment of a respective potentiometer, P1 and P2.

THREE MODULE WELDING MACHINE, THREE-PHASE DELTA PRIMARY, DOUBLE HEXAPHASE STAR OUTPUT

Figure 11:
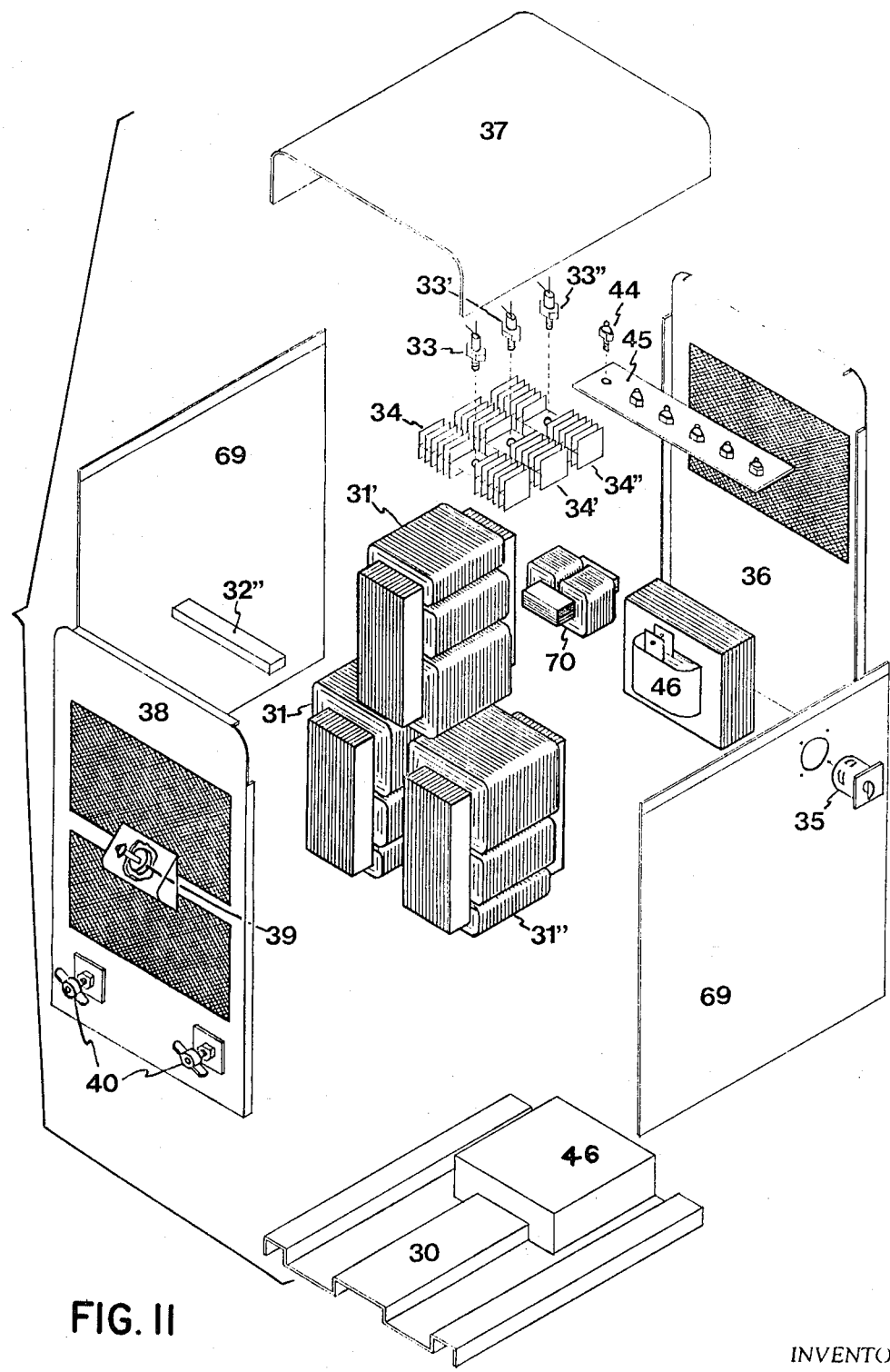
FIG. 11 is an exploded perspective view of the main components of a three phase, direct current, welding machine with three modules.

FIG. 11 is representative of one of the more complex polyphase connections of the control modules. In this case, the primaries are connected in delta and the secondaries form a double star hexaphase arrangement. The main components of this machine are: the main base 30, the modules 31, 31' and 31'', the triple electronic device 32'', three thyristors 33, 33' and 33'', and associated heat exchangers 34, 34' and 34'', the main diodes 44, the heat exchanger 45, a back cover 36, a front panel 38, the output terminals 40, an inter-phase transformer 70 and the filtering reactor 46.

Again, the operation of this machine is similar to that with a single module, except that it comprises a triple electronic control device for the respective three separate thyristors. The adjustment of the machine is carried out through three-phase potentiometer providing mechanically coupled wiper arms for the three resistances.

Figure 12:
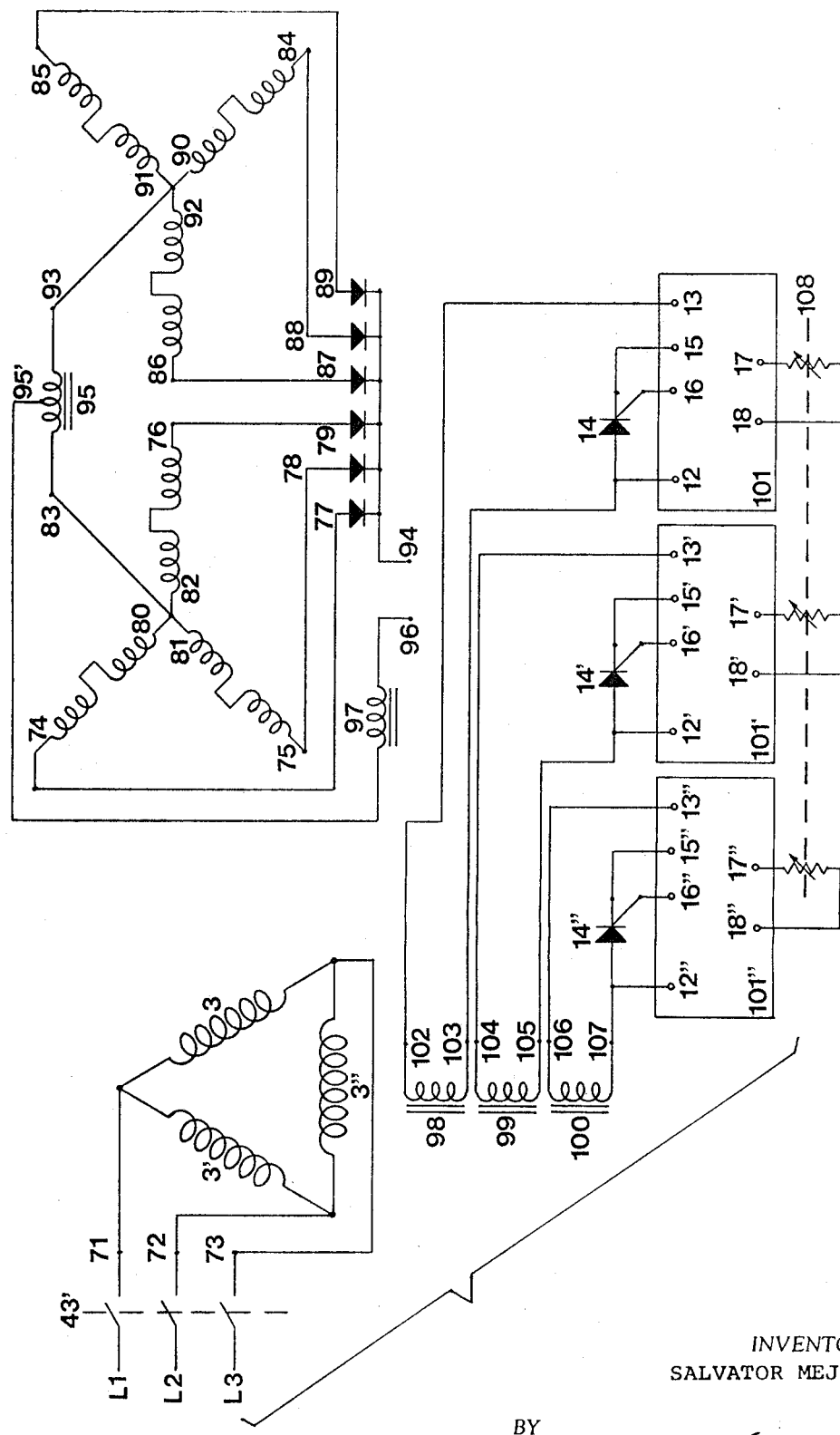
FIG. 12 is an electrical system diagram corresponding to the welding machine shown in FIG. 11 and connected in delta at the primary and hexaphase star at the secondary.

The connections of this version are illustrated in FIG. 12 and are as follows: The primaries of the three modules 3; 3' and 3'', respectively are connected in delta for connection of the three junctions 71, 72, and 73 the line terminals to L1, L2 and L3, respectively, through a three-phase switch 43'. Since each of the secondaries of the three modules is divided into two symmetrical sections, the first sections of the three modules, having the respective end terminals 74, 75 and 76, are connected to the anodes of the diodes 77, 78 and 79, respectively, while the other ends 80, 81 and 82 of the secondary windings are joined to form the neutral terminal 83 of a first star circuit.

In the same manner, the second parts of the secondary windings are arranged so that their respective end terminals 84, 85 and 86 are connected to the anodes of diodes 87, 88 and 89, respectively, whereas the other ends 90, 91 and 92 are joined at a common terminal 93 to form a second star, electrically 180° from the other star. The cathodes of the six diodes are joined to form the positive output terminal 94. The neutral terminals 83 and 93 are connected to the end terminals of the inter-phase transformer 95, whose center tap 95' is connected to the negative output terminal 96 through a filtering inductance 97 of the reactor unit 46.

The control windings in the three modules 98, 99 and 100 are connected to a respective circuit of the electronic device 101 and each circuit may be identical to the device shown in FIG. 2. Each winding having respective terminal pairs 102, 103; 104, 105; and 106, 107 is coupled to the proper terminals of a respective control circuit. (The terminals of the control circuits bear numerals corresponding to those in FIGS. 1 and 2 and the connections are the same as described there). As before, the potentiometer 108 contains three electrically separate but mechanically joined sections whose terminals 17 and 18 are connected to the first section, 17' and 18' to the second section 17'' and 18'' to the third section of the electronic control device 101.

In operation, the machine of FIG. 11 is substantially identical to that of a single module machine, except that it operates at 120° relative phase between each module, providing a three-phase, full wave rectified (hexaphase) output.

Although the invention has been described with reference to preferred embodiments, many modifications and variations of such embodiments may be made within the skill of the art. For example, electronic devices other than thyristors may be implemented in the control winding circuit, and other means of controlling the average control winding current are available. Thus, instead of varying the current duty cycle, the current amplitude may be regulated. All such modifications and variations are, accordingly, intended to be included within the scope of the appended claims.

What is claimed is:

1. An improved electrical welding machine, comprising:
a magnetic nucleus with three legs;
a primary winding wound on the first leg;
a secondary winding wound partly on the first leg and partly on the second leg;
an auxiliary winding wound on the third leg, the latter being saturable; and
an electronic control circuit connected to the auxiliary winding for regualating the amount of flux in the auxiliary winding and the flux through the secondary winding, said electronic circuit including
a first circuit including voltage reference means and unidirectional conducting means for establishing a bias voltage at a terminal;
a second circuit means including semiconductor switch means having a control electrode connected to charge storage means;
controllable resistence means connected intermediate the terminal and the charge storage means to provide a varying potential at the control electrode, said switch means operable to discharge periodically the storage means in response to such varying potential; and
means responsive to the periodic discharge of the storage means for regulating the conduction of the electronic switch means.

2. An improved electric welding machine according to claim 1, further comprising:
a second primary winding connected in parallel with the first primary winding;
a second secondary winding connected in parallel with the first secondary winding; and
a second auxiliary winding connected in parallel with the first auxiliary winding for control by said circuit.

3. An improved electric welding machine according to claim 2 further comprising
unidirectional conducting means joining the terminal ends of the secondary windings to a common point forming a first output terminal;
means electrically interconnecting the secondary windings at an intermediate point on ends thereof; and
a filtering reactor connected at one side to the interconnecting means and providing at the other side thereof a second output terminal.

4. An improved electric welding machine, comprising:
three primary windings connected in delta and interconnected for excitation from a multiphase source;
a secondary winding associated with each primary winding and connected to provide a multiphase output signal, each secondary winding providing dual end terminals, and including two sections of which a corresponding section of each winding is connected in a first star with each section providing one of said end terminals, and the other corresponding sections are connected in a second star, with each other section providing another of said end terminals;
unidirectional conducting means connecting said end terminals to a first output terminal;
means interconnecting the two secondary windings at an intermediate point on each thereof and providing a second output terminal;
three electronic control means;
a control winding in magnetic circuit with each primary winding, each control winding being responsive to one of the electronic control means to control the magnetic coupling between the associated primary and secondary windings; and
means cooperative with the electronic control means to vary the magnetic coupling between the primary and secondary windings.

* * * * *